Oct. 21, 1941.	G. V. RYLSKY	2,259,910
SEALING AND ILLUMINATING MEANS FOR INDICATING INSTRUMENTS
Filed Sept. 13, 1938	2 Sheets-Sheet 1
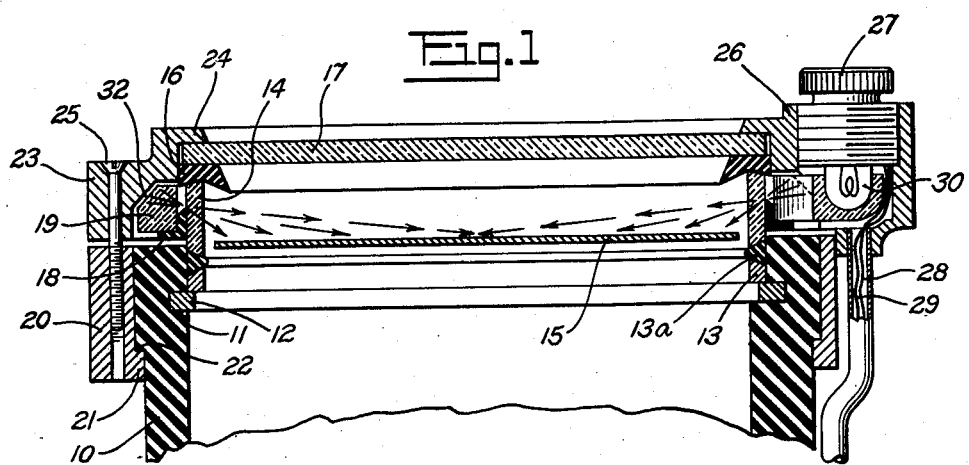
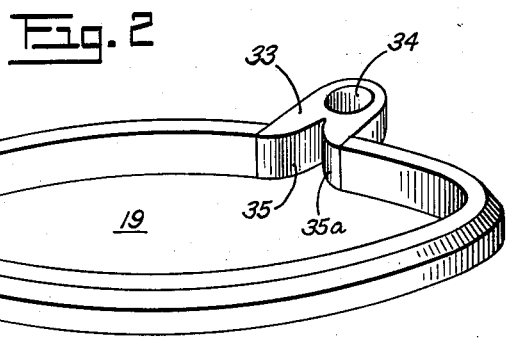
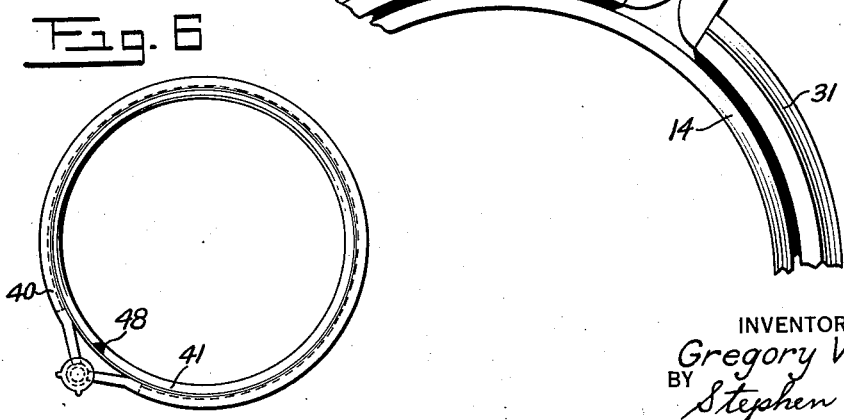
INVENTOR.
Gregory V. Rylsky
BY Stephen Čerstvik
ATTORNEY.

Oct. 21, 1941.   G. V. RYLSKY   2,259,910
SEALING AND ILLUMINATING MEANS FOR INDICATING INSTRUMENTS
Filed Sept. 13, 1938   2 Sheets-Sheet 2

INVENTOR.
Gregory V. Rylsky
BY Stephen Cerstvik
ATTORNEY.

Patented Oct. 21, 1941

2,259,910

UNITED STATES PATENT OFFICE 2,259,910

SEALING AND ILLUMINATING MEANS FOR INDICATING INSTRUMENTS

Gregory V. Rylsky, New York, N. Y., assignor to Bendix Aviation Corporation, South Bend, Ind., a corporation of Delaware Application September 13, 1938, Serial No. 229,746

15 Claims. (Cl. 73—151)

The present invention relates to indicating instruments and more particularly to instruments of the pressure actuated type, and to sealing means and illuminating means for such instruments.

The invention embodies novel means for sealing the casing of a pressure responsive indicating instrument, and also includes novel means for producing uniform illumination of the dial of the instrument.

More specifically, the device embodying the invention is provided for the purpose of sealing an instrument casing in a novel manner whereby the casing may be simply and effectively sealed and whereby the major portion of the illuminating means may be located outside of the sealing means and exterior to the pressure area of the casing.

One of the objects of the invention is to provide sealing and illuminating means for an indicating instrument embodying a novel assembly whereby effective sealing of the instrument casing and a simple and effective illuminating system are produced.

Another object is to provide novel means for detachably connecting sealing means to the casing of an instrument.

Still another object is to provide novel illuminating means whereby the light supply for illuminating the instrument dial is prevented from directly reaching the eye of an observer reading the instrument indication.

A further object is to provide novel clamping means for assembling an indicating instrument and comprising a casing, a shoulder on said casing, a ring surrounding said casing and abutting said shoulder, a second ring, means on said second ring for holding a cover-glass between said means and said casing, and means removably connecting said rings together.

Still another object is to provide novel sealing means for an indicating instrument, comprising a casing, a circumferential slot on the interior of said casing, a resilient ring inserted in said slot, means including a sealing ring supported by said ring for providing a shoulder on the interior of said casing, a transparent ring abutting said shoulder, a second sealing ring abutting said transparent ring, a cover-glass, and means for maintaining said cover-glass, said second sealing ring, said transparent ring, said shoulder providing means, and said resilient ring in pressure sealing relation.

A still further object of the invention is to provide novel sealing and illuminating means comprising a bezel, a cover-glass within said bezel, a sealing ring abutting said cover-glass, a transparent ring abutting said sealing ring with one side thereof, a second sealing ring abutting said transparent ring on the other side thereof, a light-conducting and light-emitting member surrounding said transparent member, and means maintaining all of said elements within said bezel.

The above and further objects and advantages of the invention will appear more fully hereinafter from a consideration of the detailed description which follows, taken together with the accompanying drawings wherein two embodiments of the invention are illustrated. It is to be expressly understood, however, that the drawings are for the purpose of illustration and description only and are not designed as a definition of the limits of the invention, reference being primarily had for this purpose to the appended claims.

In the drawings wherein like reference characters refer to like parts throughout the several views;

Fig. 1 is a cross-section in elevation, illustrating one embodiment of the novel assembly;

Fig. 2 is a view, in perspective, illustrating the light-conducting and light-emitting means;

Fig. 3 is a plan view of a subcombination of the assembly of Fig. 1;

Fig. 6 is a plan view of a sub-combination of the assembly of Figs. 4 and 5.

Figure 4:
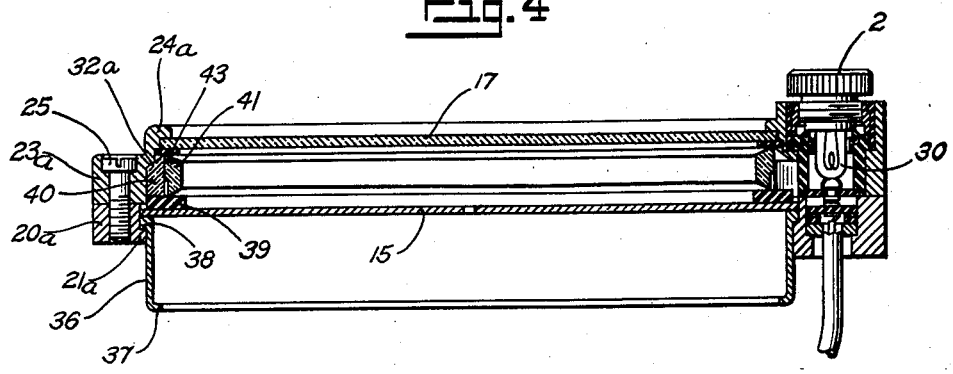
Fig. 4 is a cross-section in elevation illustrating another embodiment of the invention.

Referring to the drawings and more particularly to Fig. 1, 10 is a casing for an indicating instrument of the pressure actuated type, such as an altimeter. Within the casing 10 is located a novel sealing and illuminating assembly comprising a circumferential slot 11 within which is expanded a split resilient ring 12 forming a supporting shoulder on the upper side thereof. A solid bevel ring 13 abutting the split ring 12 is mounted on the shoulder formed by said ring. A resilient sealing ring 13a of rubber or other suitable resilient material is mounted on the bevel of ring 13 and carries on the upper part thereof a transparent ring 14 forming a continuous window for the light to be projected upon the dial 15 which is held in mounted position on the instrument mechanism (not shown) within the casing 10. A ring-shaped bevelled sealing member 16 of rubber or other suitable resilient material provided with a downward extending circular flanged portion is mounted above and in abutting relation with the transparent ring 14. Carried by the sealing member 16 and urged thereagainst by means which will be described in detail later is a cover-glass 17. Surrounding said transparent ring 14 and separated therefrom by a circular shield 18 is a light-conducting and light-emitting member 19 which will be described more fully hereinafter.

Novel means are provided for resiliently sealing the casing 10 by urging the cover-glass 17 against the other elements of the novel sealing combination. Said sealing means comprise a ring 20 provided with a flange 21 abutting a shoulder 22 formed on the casing 10. A second ring 23 provided with a flange 24 is mounted in cooperating position with respect to the ring 20. Screws 25 serve to fasten the rings 20 and 23 together whereby the flange 21 of ring 20 abuts against shoulder 22 and the flange 24 abuts the cover-glass 17, whereby the elements of the sealing combination are maintained in resiliently sealing relationship to thereby effectively seal the interior of the instrument casing 10 while the light-conducting member 19 is located outside of the sealed volume.

A boss 26 is formed on ring 23 and provides a receptacle for a miniature lamp assembly 27 which is screwed into position within the boss 26 to thereby provide electrical contact with a source of electrical potential by means of conductors 28 and 29. A bulb 30 projects from the lamp assembly and co-acts with the light-conducting and light-emitting member in a manner that will now be described. The lamp receptacle and lamp assembly may be of any suitable type such, for example, as shown in co-pending application Serial No. 165,587, filed September 24, 1937, or Serial No. 181,978, filed December 27, 1937.

Referring to Fig. 2 of the present drawings there is illustrated in detail the construction of a light-conducting and light-emitting member 19 which comprises a split ring 31 having a beveled edge 32 which is treated or painted in the manner described in applicant's co-pending application Serial No. 29,323, filed July 1, 1935, whereby light is uniformly reflected towards the space bounded by ring 31. Located within the space formed between the ends of split ring 31 is a member 33 having an opening 34 into which projects the bulb 30 of the miniature lamp assembly. The light from the bulb 30 enters the member 33 and is reflected from the surfaces 35 and 35a thereof so that the light is uniformly transmitted about both sides of ring 31 and is emitted uniformly therefrom in a manner described in detail in the above mentioned co-pending application Serial No. 29,323.

In Fig. 3 of the present drawings is illustrated a part of the novel combination of Fig. 1, wherein the shielding member 18 is shown as located between the inner transparent ring 14 and the outer split light-conducting ring 31.

The operation of the illuminating means is as follows:

Light is emitted from the bulb 30 and enters the member 33 whereby the light is transmitted uniformly throughout both sides of ring 31. The beveled edge 32 projects the light as shown by the arrows in Fig. 1, so that none of the light is directed towards the eye of an observer reading the indication of the instrument on dial 15. Since the entire ring 31 is a source of light emission, some of the light might be emitted therefrom towards the eye of an observer, but such emission is prevented by the use of shield 18 which prevents light from being emitted at an angle directed upwardly as illustrated in Fig. 1, and by the use of the sealing member 16 light is prevented from being emitted upwardly as it emerges from the upper part of the transparent ring 14. All of the light is therefore directed downwardly against the dial 15 as shown by the arrows in Fig. 1, and the eye of the observer is fully protected from the artificial light utilized for illuminating the dial. By the use of the novel sealing combination, the light-conducting member may be located free of the pressure area within the casing, and the miniature lamp assembly may be adjusted or replaced without in any manner interrupting the pressure in the casing 10.

Figure 5:
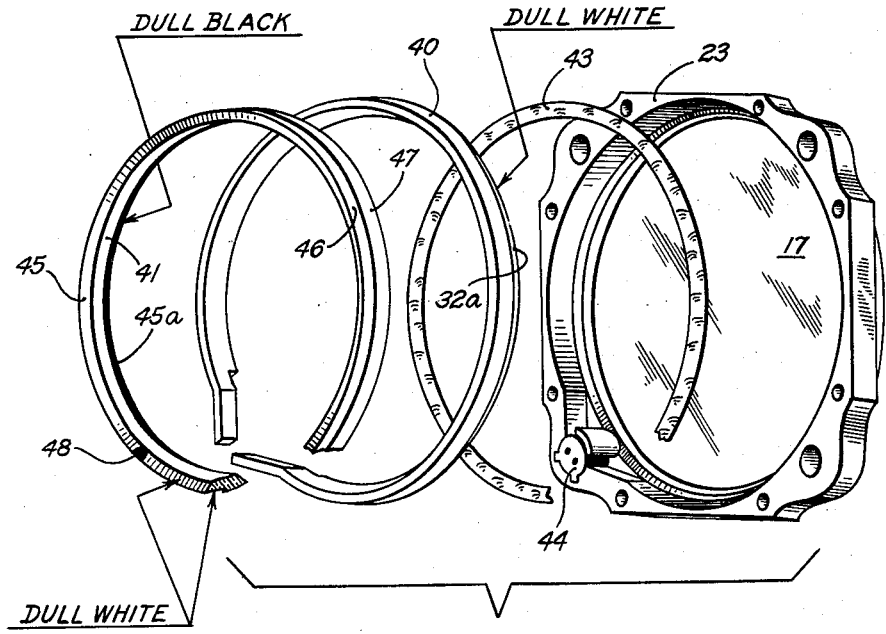
Fig. 5 is an exploded view, in perspective, illustrating in detail the assembly of the elements within the bezel of Fig. 4.

In Figs. 4 and 5 is illustrated a second embodiment of the invention, comprising a metal collar 36 which is utilized to protect the casing 10 when said casing is made of "Bakelite" or some such frangible material. Collar 36 is provided with a flange 37 which abuts a shoulder formed on the casing 10, as in Fig. 1, and a second flange 38 is held by the flange 21a of ring 20a. The dial 15 is held in position by the novel sealing and illuminating means which will now be described in detail. Referring to Fig. 4, there is shown therein a rubber ring 39 abutting dial 15 upon which ring is mounted an outer split ring 40 of light-conducting material which is treated, as will be described in detail later, so as to emit light upon the dial without directing the light rays towards the eye of an observer. Within the split ring 40 and internested therewith is the novel, ring-shaped window member 41. A resilient gasket 43 is located in abutting relation to the ring members 40 and 41. The ring 23a, by means of flange 24a, presses the cover-glass 17 against the gasket 43 and compresses the novel sealing and light-conducting member between the gaskets 43 and 39.

Referring to Fig. 5, there is illustrated a detailed construction of the elements comprising the novel sealing and light-conducting means of Fig. 4. Within the bezel or top clamping ring 23a is the cover-glass 17 which is located in position abutting the flange 24a. The miniature lamp 2 may be replaced by a dummy lamp 44 which is slightly larger than lamp 2 and during the assembly only of the device, is located within the bezel. Gasket 43 is assembled with one side thereof in abutting relation with the cover-glass and the bevel 32a of the outer split light-emitting ring 40 abuts the other side of gasket 43. Said ring is generically of the same construction as illustrated in Figs. 1 and 2 and is located within the bezel with the ends thereof on opposite sides of the dummy lamp 44 as shown in Fig. 6. The inner ring 41 is then assembled within the split ring 40. Said inner ring 41 comprises a continuous ring of light conducting materal having slightly beveled edges 45 and 45a. Beveled edge 45 is first covered with a coating of light absorbing material such as dull black paint and is then covered with light reflecting material such as dull white paint. Any other means for reflecting the light and thereby preventing the entry thereof into the ring at the beveled edge may be utilized. The beveled edge 45a is covered with a layer of white paint and then a layer of dull black paint or other light absorbing material. This edge is placed against the cover-glass. A portion 46 of the outer circumference of the ring is also covered with black paint and then a layer of white paint as was described in connection with beveled edge 45. This portion 46 forms a zone extending completely around the ring 41 and covering approximately one half of the outer circumference of the ring, leaving a clear zone 47 through which the light enters ring 41. The ring is so oriented that the black spot 48 is located adjacent the dummy lamp so that the light entering the ring from the lamp 2, after the device is in operation, and having its greatest intensity at this point, will not be transmitted through the layer of light reflecting material. The operation of the device is as follows:

Light is conducted from the bulb 30 located between the ends of split ring light-conducting member 40 into the interior of the light-conducting member. The layer of dull white paint on the beveled edge 32a of ring 40 directs the light downwardly towards the dial as viewed in Fig. 4. This light is transmitted through the clear portion or zone 47 of ring 41, the portion 46 thereof preventing the entry of light into ring 41 through said portion. In this manner, the light is directed downwardly in the same manner as shown by the arrows in Fig. 1 so that none of the light can be emitted towards the eye of an observer. The light is transmitted through the ring 41 serving as a window on to the dial 15 whereby said dial is uniformly illuminated throughout its extent. The dull black covering on the beveled edge 45 prevents the light from being conducted outwardly towards the eye of an observer.

Novel means are therefore provided whereby uniform illumination of the dial is obtained and all light is prevented from emerging from the light source directly to the eye of an observer.

Although only two embodiments of the invention have been illustrated and described, other changes and modifications in form, material, and relative arrangement of parts which will now appear to those skilled in the art, may be made without departing from the scope of the invention. Reference is therefore to be had to the appended claims for a definition of the limits of the invention.

What is claimed is:

1. In a device of the character described, a casing having an opening therein, means providing a shoulder on said casing, a first retaining element surrounding said casing and abutting said shoulder, a second retaining element provided with a flange, a cover-glass beneath said flange for sealing the opening in said casing, a first sealing ring beneath said cover-glass, a transparent ring-shaped member beneath said sealing ring, a second sealing ring beneath said transparent member, means within said casing supporting said second sealing ring, and means connecting said first retainer and said second retainer whereby said recited elements are maintained in sealing relationship to thereby seal the interior of said casing.

2. In a device of the character described, a casing having an opening therein, means providing a shoulder on said casing, a first retaining element surrounding said casing and abutting said shoulder, a second retaining element provided with a flange, a cover-glass beneath said flange for sealing the opening in said casing, a first sealing ring beneath said cover-glass, a transparent ring-shaped member beneath said sealing ring, a second sealing ring beneath said transparent member, means within said casing, supporting said second sealing ring, means connecting said first retainer and said second retainer whereby said recited elements are maintained in sealing relationship to form a sealed chamber in the interior of said casing, a light-conducting and light-emitting member surrounding said transparent member, and means for introducing light into said light-conducting member.

3. In a device of the character described, a casing having an opening therein, means providing a shoulder on said casing, a first retaining element surrounding said casing and abutting said shoulder, a second retaining element provided with a flange, a cover-glass beneath said flange for sealing the opening in said casing, a first sealing ring beneath said cover-glass, a transparent ring-shaped member beneath said sealing ring, a second sealing ring beneath said transparent member, means within said casing supporting said second sealing ring, means connecting said first retainer and said second retainer, a light-conducting and light-emitting member surrounding said transparent member, means for introducing light into said light-conducting member, and a shield between said light-conducting member and said transparent member whereby light is prevented from emerging from said casing at such an angle as to meet the eye of an observer reading the instrument.

4. In a device of the character described, a casing having an opening therein, means providing a shoulder on said casing, a first retaining element surrounding said casing and abutting said shoulder, a second retaining element provided with a flange, a cover-glass beneath said flange for sealing the opening in said casing, a first sealing ring beneath said cover-glass, a transparent ring-shaped member beneath said sealing ring, said first sealing ring overlapping said transparent member whereby light is prevented from emerging from said transparent member at such an angle as to meet the eye of an observer reading the instrument, a second sealing ring beneath said transparent member, means within said casing supporting said second sealing ring, and means connecting said first retainer and said second retainer, whereby said recited elements are maintained in sealing relationship to thereby seal the interior of said casing.

5. In a device of the character described, a casing, a cover glass for said casing, a ring-shaped transparent member, means maintaining said cover-glass, said member and said casing in pressure sealing relationship, and a light-conducting and light-emitting member surrounding said transparent member.

6. In a device of the character described, a casing, a cover-glass, means including a transparent ring and a pair of sealing rings cooperating with said cover-glass to effectively seal said casing, and a ring-shaped light-conducting and light-emitting member surrounding said transparent ring.

7. In a device of the character described, a ring-shaped light-conducting member comprising opaque portions surrounding a predetermined transparent portion arranged to conduct light in a predetermined direction, and a ring of light-conducting and light-emitting material surrounding said light-conducting member, a beveled edge on said light-emitting member, said edge being so treated that light is reflected thereby uniformly throughout the extent of the member, said transparent portion of said light-conducting member being located adjacent to said beveled edge thereby intercepting said reflected light and the opaque portions thereof being located relatively remotely therefrom.

8. In a device of the character described, an outer split ring light-conducting and light-emitting member having a bevel formed on one edge thereof, means providing a light reflecting surface extending along said bevel, a ring of light-conducting material surrounded by said split ring, a zone of light-reflecting material extending completely around a portion of said inner ring and between said inner and outer ring, the remaining portion of said inner ring being transparent, and means preventing emission of light from said inner ring at the top and bottom edges thereof whereby light is conducted by the transparent portion of said inner ring in a predetermined direction.

9. In a pressure responsive indicating instrument, a casing having an opening therein, a retaining element surrounding said casing, a second retaining element provided with an inward projection, a cover-glass cooperating with said projection, means within the casing for resiliently supporting said cover-glass to close said opening, said means comprising an inwardly extending circular flanged portion forming a light deflecting shield, and means connecting said first retaining element and said second retaining element whereby said cover-glass is resiliently maintained in pressure sealing relationship with said casing.

10. In an indicating instrument of the pressure responsive type, a casing, means for sealing said casing, said sealing means comprising a ring-shaped transparent member, a ring-shaped light-conducting and light-emitting member surrounding and co-operating with said transparent member, a light source for said light-conducting and emitting member, and means removably mounting said light source exteriorly of said sealing means.

11. In a device of the character described, a casing, a cover glass for said casing, means co-operating with said cover glass for sealing said casing and comprising a transparent ring-shaped member, a ring-shaped light-conducting and light-emitting member substantially surrounding said transparent member whereby light is introduced into said casing, and a shield extending around said transparent ring whereby only a portion of said light-conducting and light-emitting member is effective for introducing light into said transparent member.

12. In a device of the character described, a casing provided with an open end, means for sealing the open end of said casing comprising a transparent ring member, a light source, a light-conducting and light-emitting ring member between said light source and said transparent ring whereby light rays emitted from said light-conducting and light-emitting ring member are transmitted through said transparent member to the interior of said casing, and means providing a ring of opaque material partially extending between said light-emitting member and said transparent member.

13. In a device of the character described, a casing provided with an open end, means for sealing the open end of said casing comprising a ring-shaped member, a light source, and a light-conducting and light-emitting ring member between said light source and said ring-shaped member, said ring-shaped member having alternate transparent and opaque sections along the outside periphery thereof for directing light rays from said light-conducting and light-emitting member in a predetermined direction.

14. In combination with a source of light and a transparent ring member, a light-conducting ring-shaped member adjacent the transparent ring member having an upper light-absorbing bevelled edge and a lower light-reflecting bevelled edge, and an outer periphery divided into two sections, each of which extends completely about the member, one section adjacent the lower bevelled edge being light-reflecting and the other section adjacent the upper bevelled edge being light-conducting so as to transmit therethrough in a predetermined direction light rays emanating from said source.

15. In a device of the character described, a casing, a cover glass for said casing, means comprising a source of light carried by said casing, a ring-shaped transparent member for transmitting light rays therethrough from said last-named means to the interior of said casing, and means comprising a retaining member surrounding said casing and a retaining bezel secured to said retaining member for maintaining said cover glass, said member and said casing in pressure sealing relationship.

GREGORY V. RYLSKY.